United States Patent Office 2,839,388
Patented June 17, 1958

2,839,388

SEPARATION OF ZINC AND COPPER

George Frederick Van Hare, Jr., North Kansas City, and Oscar Stephen Kunz, Jr., Kansas City, Mo., assignors to Chemical Construction Corporation, New York, N. Y., a corporation of Delaware No Drawing. Application December 16, 1955
Serial No. 553,414

8 Claims. (Cl. 75—103)

The present invention relates to the separation of zinc values from ammoniacal process liquors obtained in treating zinciferous materials containing other non-ferrous metals. More specifically, it deals with the precipitation of zinc compounds from an ammoniacal-ammonium salt liquor containing dissolved zinc and also at least one dissolved non-ferrous metal capable of forming a gas-reducible, complex ammine which is soluble in the liquor. Still more particularly, the non-ferrous metal is usually copper, cobalt or nickel. In general, the process of the present invention may be simply stated. The application of heat is used to drive off excess $NH_3$ and $CO_2$ which is not associated with a metal in a metal ammine complex. The feature is that the water content is controlled during this operation.

As a result of increasing demand for zinc, copper, nickel, cobalt and other non-ferrous metals, commercial interest in their more efficient production and recovery is also continually increasing. In recent years, this has resulted in many developments in hydrometallurgical procedures utilizing leaching, solution purification and chemical precipitation of the metal. Unfortunately, these metals are usually found associated with each other. This is true whether the source materials be ores, ore concentrates, secondary metals, industrial wastes or commercial by-products. This fact has introduced most of the difficulties in attempting the development of such methods of chemical treatment on a commercial scale.

Zinc in particular presents a difficult problem. In the ammoniacal leach liquors commonly used in such methods, zinc dissolves at substantially the same rate as copper when the latter is present. While this solution rate may be somewhat faster than those for cobalt or nickel, when these latter metals are present they also dissolve to some extent before zinc and copper extraction is completed. For the same reason, silver, cadmium, lead and even iron ordinarily may be found dissolved to some extent, although in some cases this is limited by the solubility of their salts.

Typical difficulties encountered in hydrometallurgical zinc production may be readily demonstrated in the separation of zinc during the recovery of copper from scrap brass or bronze and the like, as well as from mixtures of them with copper scrap. Accordingly, such a treatment will be taken as illustrative for the purposes of this discussion.

U. S. Letters Patent No. 2,695,843, issued November 30, 1954, to Van Hare et al., and other publications, show one method of leaching such secondary metals with an ammoniacal-ammonium salt liquor, containing dissolved copper and/or zinc salts and the subsequent separation of copper and zinc. The leaching liquor should contain sufficient ammonia and also sufficient ammonium carbonate, or other ammonium salt, to hold the requisite amounts of copper and/or zinc in solution.

If the proportions between the dissolved materials and resultant pregnant leach liquor are adjusted properly, either a zinc or a copper product may be precipitated initially and the other product then recovered. For example, in leaching copper scrap containing but little zinc, good practice produces a liquor containing some 110–135 grams per liter of copper, some 165–210 g./l. of $NH_3$ and some 100–130 g./l. of $CO_2$. The zinc content is only incidental. It is possible, not only theoretically but actually, by using a reducing gas such as hydrogen or carbon monoxide at superatmospheric temperature and pressure, to precipitate substantially all of the copper from solution.

However, precipitating copper to this extent is undesirable for various economic reasons. Such considerations as the time of treatment and the autoclave capacity required to reduce all the dissolved copper metal and the purity of the copper product are unfavorable. In any one cycle, the dissolved copper content ordinarily would not be reduced much below about 50–80 g./l. Resultant liquor which contains copper, ammonia and carbon dioxide is reused in the next leaching operation. While this results in a circulating load of dissolved copper, all the copper leached is eventually taken as product. Some dissolved copper in the recycled liquor is desirable to insure rapid leaching of the copper and zinc contents of the scrap.

But since copper and zinc dissolve at about the same rate, in treating a scrap feed of relatively high zinc content both metals, at least initially, tend to be leached in about the proportion they are present in the feed. Although it is still desirable to have the dissolved copper content as high as practicable, it will seldom exceed about 135 g./l. and with such a feed, in the first leaching cycle at least, up to asome 30 g./l. of zinc also may dissolve. The $NH_3$ and $CO_2$ contents will be in about the same ranges just mentioned. A good copper reduction to substantially zinc-free copper metal may be carried out on such a liquor.

Up to about 50 g./l. of zinc in the pregnant copper leach liquor usually is not objectionable. In fact, some zinc content may even be considered as desirable. For each mol of copper metal deposited during copper reduction, about two mols of $NH_3$ which has been associated therewith in the ammine is released into the liquor. The presence of some zinc has some sort of useful controlling effect on ammonia so-released. More than about 50–60 g./l. of dissolved zinc, however, begins to markedly affect the efficiency of copper recovery and above about 70 g./l. is undesirable.

After copper reduction, the end liquor is normally returned to leaching, as noted above. It should contain some 20–70 g./l. of copper and may contain, as can now be seen, some 30–35 g./l. or more of zinc. But during leaching in the next cycle, still more zinc is taken up. When this is continued in succeeding cycles, copper leaching and recovery become progressively less efficient and the whole circuit becomes overloaded with zinc. The greater the zinc content in the feed, the more quickly this condition is reached.

It is apparent then, that for efficient copper recovery to continue there must be some limitation on the zinc content of the recycle liquor. Zinc metal and/or zinc compounds easily converted thereto, also constitute commercially valuable products. This provides an additional incentive to collect a zinc product from the copper reduction end liquor before it is recycled to leaching.

Unfortunately, though clearly desirable, no wholly satisfactory methods for separating and recovering such a zinc product have been available. Zinc recovery presents several unexpected problems. For instance, $NH_3$ liberated during copper metal deposition is available for solubilizing other materials. As a result, zinc cannot be readily precipitated unless this $NH_3$ is in some manner accounted for. One proposal is to add sufficient $CO_2$ to convert any excess $NH_3$ to ammonium carbonate, This should reduce the free $NH_3$ content and increase the ammonium carbonate content to relative proportions at which zinc products can be precipitated more readily. Subsequently, both $NH_3$ and $CO_2$ can be recovered for reuse. While technologically operable, unfortunately the expense of reconstituting the ammonia is such an appreciable item in such a process that the overall cost is excessive.

Another proposal applies heat to volatilize the requisite amount of $NH_3$ and $CO_2$ and obtain a zinc precipitate. One specific proposal utilizes low temperatures and sub-atmospheric pressures. Treatment is continued until sufficient zinc precipitate is obtained.

This method presumes zinc and copper to be in solution as metal ammine carbonates of the probable formulae $Zn(NH_3)_4CO_3$ and $Cu(NH_3)_2CO_3$, together with ammonium carbonate and ammonia or ammonium hydroxide. Incipient precipitation of zinc as a white compound seems to occur on volatilization of substantially all ammonia and carbon dioxide not directly associated with some metal in an ammine salt. Zinc ammines appear somewhat less stable during heating than those of the copper and to be preferentially converted to an insoluble basic zinc compound with evolution of ammonia and carbon dioxide. Resultant white zinc precipitate is usually designated as a basic zinc carbonate. Actually, it is more probable that the precipitate is some double salt of zinc carbonate, such for example as

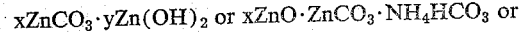

$xZnO \cdot ZnCO_3 \cdot (NH_4)_2CO_3 \cdot H_2O$. In any case, it may be calcined to recover $NH_3$, $CO_2$ and a saleable zinc oxide product.

Prior to this invention, such controlled volatilization was the best available procedure. Even so, it was not wholly satisfactory. In any one overall cycle, the dissolved zinc content after leaching must be maintained below some optimum level. Otherwise, during leaching in the next cycle, the dissolved copper content cannot be brought up to the high level desired for efficient copper reduction without concomitantly obtaining an excessive dissolved zinc content. A satisfactory zinc precipitation process should be capable of reducing the dissolved zinc by from about 40% to about 60% in each cycle, averaging about 50% in continued operation. Otherwise, the circuit cannot be continually operated, even when all the end liquor is treated to remove zinc. In addition, such a process must do so without excessive coprecipitation of other dissolved metals. These results ordinarily cannot be accomplished by the volatilization process unless copper reduction is carried beyond the residual copper content which is favored by other economic factors.

It is, therefore, the principal purpose of the present invention to devise a method which is not subject to this limitation. Preferably, the general circuit should not be radically altered. Preferably, removal of the excess $NH_3$ in the copper reduction end liquor should be capable of being carried to a value at which the dissolved zinc content is reduced to a suitable level by zinc precipitation, while retaining all the copper in solution.

These objects have been suprisingly successfully accomplished. This has been done by, in an $NH_3$ volatilization process, controlling the water content during gas evolution. Thereby, not only can the $NH_3$ and the $CO_2$ contents be reduced as desired, but premature copper precipitation is prevented. The water content control is a factor previously ignored. It converts an otherwise unsatisfactory procedure into one which can produce a zinc product of desirable quantity and purity. It permits this to be done without uneconomically interfering with the general circuit, including the recovery of the other non-ferrous metals such as the illustrative copper.

In the present process, good leaching practice is intended to produce a leach liquor having the desired high content of some metal other than zinc. As noted above in the illustrative case of copper, this will be some 110–135 g./l. or more. Nickel or cobalt may be, but seldom are, as high as 120 g./l. This is desirably done without obtaining a zinc content exceeding about 50–70 g./l. Resultant leach liquor is then treated in some manner, not part of this invention, to precipitate the metal of primary interest in elemental form. Illustrative methods are shown, for example, in Canadian Letters Patent No. 514,-814. In the case of copper as illustrative, this will produce an end liquor containing some 20–70 g./l. of copper, and some 20–65 g./l. of zinc. Up to about 230 g./l. of $NH_3$ and 160 g./l. of $CO_2$ also may be found. In good practice, the end liquor will contain equal weights of dissolved copper and zinc.

Any zinc-bearing end liquor can be treated to recover zinc precipitate. In the illustrative case, it is seldom necessary or economically desirable if the content is less than about 10–20 g./l. of zinc. If in the whole overall circuit the total dissolved zinc is above about 35 g./l. and in the next cycle would, during leaching, appreciably exceed about 50 g./l. zinc separation should be done. A preferable zinc reduction feed liquor in a good copper recovery circuit will contain some 40–60 g./l. zinc, averaging about 50 g./l.; and some 40–70 g./l. of copper, averaging about 55 g./l. In this preferred average range, the end liquor usually will also contain about 210 g./l. of $NH_3$ and 125 g./l. $CO_2$. Depending upon the nature of the material being leached and the size of the overall circuit, all or only part of the copper reduction end liquor may be sent to the zinc recovery circuit to maintain the desired total zinc content level in the overall system.

As stated above, one of the primary features of the present process is the control of the water content during the application of heat to drive off such $NH_3$ and $CO_2$ as is not associated with a metal in a metal ammine complex. Heating is carried out until the residual dissolved zinc content is sufficiently low, preferably 50% or less of the initial content. While such a general statement is simply made, in actual operation it is not so simple. Several factors are important and should be considered.

For example, there is the factor of temperature. Volatilization of the $NH_3$ and $CO_2$ may be most simply and quickly accomplished by boiling the liquor. At atmospheric pressure, the initial boiling point is usually from about 70° to about 80° C., but will rise during heating. At temperatures above about 90° C., however, there is an increased tendency toward the breakdown of copper ammine carbonate complex with resultant precipitation of a bluish, insoluble, basic copper-containing solid which destroys the commercial value of the zinc precipitate. Ordinarily $NH_3$ evolution to the necessary extent is usually capable of completion at a boiling point of some 80°–90° C. If not, however, maintaining a maximum temperature of 90° C. is desirable and temperatures above about 95° C. should be avoided in any case. Any advantages in more rapid volatilization at the higher temperatures are as likely to be offset by copper precipitation as zinc contaminant.

On the other hand, while temperatures somewhat less than 60° C. may be used if so desired, particularly under reduced pressure, they are not as efficient. While the temperature used may range from about 60° to about 95° C., atmospheric boiling at from about 73° to about 90° C. is preferred. Because of the effect of temperature on solubilities, for best results the solution should be cooled to room or process water temperature before separation of the zinc precipitate from residual solution. Preferably cooling should be to about 32° C., or less.

Zinc precipitate is collected by filtration of the cooled liquor, or some equivalent expedient. It is usually washed to remove any soluble components. In some cases, the precipitate as formed will contain minor amounts of copper but the amount and solubility thereof will be such that it is readily removed in the washing. Washing with water with a small amount of ammonium carbonate solution and again with water is to be preferred. The mechanics of filtering and washing are well known.

For optimum results, the copper content of the liquor should be in the cupric state. If, prior to zinc precipitation, the solution contains above about 20 grams per liter of cuprous copper, it is desirable but not essential that the liquor be given a mild oxidation to convert at least that amount of cuprous copper in excess of this amount to the cupric condition. This can be done in any desired manner, the exact method of oxidation forming no part of the present invention.

In general, the factors in regulating the extent of $NH_3$ and $CO_2$ volatilization may be summarized as follows. The zinc and copper-bearing liquor which is to be recycled should be effective for leaching. It is, therefore, the content of dissolved zinc and cooper in the cooled and filtered recycle liquor which is controlling with respect to the end of the present treatment and not necessarily the dissolved zinc or copper content of the hot liquor when heating is stopped. It is, therefore, somewhat meaningless to assign exact numerical limitations to the solutes content of the liquor before cooling.

Even in the cooled liquor to be recycled numerical limits do not mean too much, even though for any one circuit the ratio of zinc to other non-ferrous metal, in the illustrative case copper, is a major economic factor in obtaining not only effective leaching but also effective metal reduction and effective zinc precipitation. Both economically optimum "other-metal" leaching and "other-metal" reduction indicate that the "other-metal" content should be sufficiently high that in the optimum leaching time the liquor becomes substantially saturated in the ammines of that metal. In the illustrative case of copper, where 110–135 g./l. of copper is wanted after leaching, good practice indicates some 50–70 g./l. of copper should be retained after zinc removal. If sufficient leaching facilities are available, this range can be decreased. On the other hand, nickel and cobalt recycle liquors per se usually do not require any minimum nickel or cobalt content be recycled to insure an adequate concentration after leaching. Regardless of the amount of zinc retained, no general numerical ratios can be stated for all cases.

However, in general, enough zinc should be precipitated to equal that amount which will be dissolved along with the "other metal" such as copper in the next leaching cycle. Again, for the illustrative case discussed above, this would mean zinc precipitation by $NH_3$ and $CO_2$ volatilization should stop at a residual $NH_3$ and $CO_2$ content which will retain the desired 50–75 g./l. of copper. Translated into terms of dissolved zinc content of the treated liquor after cooling, this will average about 35 g./l. of zinc in a boiled-down liquor containing some 80–85 g./l. of $NH_3$ and 95–100 g./l. of $CO_2$. Based on an initial zinc content of 50 g./l. after copper reduction, this is equivalent to a removal of about half the zinc. Since zinc may go as high as 70 g./l. during leaching, more than half is easily removed and this more than meets this requirement of the objects of the invention.

Prior proposals for the use of $NH_3$ and $CO_2$ volatilization were not concerned with water content control. It was considered that concomitant water loss during $NH_3$ and $CO_2$ removal was incidental and negligible. This is not so surprising an opinion since it was the overall result after volatilization and cooling which was considered to be governing. From such a point of view, the net volume reduction at this point would not appear excessive for the low residual copper and zinc content.

According to the present invention, however, it has been found that this consideration is erroneous so far as the water content is concerned. It has been found that conditions during volatilization are controlling as to the optimum rate water removal. The rate at which the $NH_3$ and $CO_2$ are being driven off is also a factor in the rate of water removal.

It is desirable to drive off the $NH_3$ and $CO_2$ as rapidly as possible down to the content which after cooling will be as discussed above. Therefore, this usually will be done at about the boiling point, whether under atmospheric or subatmospheric pressure. As pointed out above, this will be at about 73°–90° C., with the exception noted on not boiling above about 95° C. According to this invention, it has been found that when $NH_3$ and $CO_2$ are removed under these conditions, i. e., optimum with respect thereto, the concomitant rate of water vapor evolution is from about 50 to 70 weight percent too rapid. Usually it will be found that this figure is roughly three-fifths. In other words, in the prior practice the residual water content, on a weight basis, was being continually reduced to about two-fifths of that which has now been found desirable to insure a negligible "other metal" content of the zinc precipitate. It is, therefore, a principal feature of the present invention to provide against this result.

It is desirable, in order to insure maximum evolution of the fixed gases to allow the water to evolve at whatever random rate is incidentally obtained. Accordingly in the present process, this is done. The residual water content control is obtained by returning water to the volatilization step at about three-fifths the rate at which it is being evolved. Again the three-fifths value is used as an approximate designation and may vary from as little as about 40% to so high as about 70%.

Water may be returned from any source. For example, process water in some adequate amount may be added to the vessel periodically throughout the operation. More simply, a reflux column can be provided and cooling water and/or feed liquor supplied thereto at such rate that the desired amount of evolved water vapor is condensed and returned. This continuous reflux procedure not only saves heat but has a further advantage. The brisk evolution of gases results in some liquor entrainment. If the gases are discharged through a suitable reflux apparatus, the entrained liquor is not only prevented from passing further into the circuit but is also washed back.

The provision of water control in this way has a marked beneficial effect on the resultant precipitate. According to the best prior practice, on a commercial scale, it was impossible to obtain the necessary zinc content reduction without the zinc precipitate containing the high content of copper noted above. In the practice of the present invention, sufficient zinc can be readily precipitated containing less than 0.3% copper which is commercially satisfactory. With a little more attention to control and using continuous reflux this can be lowered readily to less than 0.1%.

In the foregoing discussion, as well as in the appended claims, the rate of water evolution from the heated liquor is considered to be that at atmospheric pressure. In those few cases where superatmospheric or subatmospheric pressure are used as discussed above, the water control can be readily adjusted to produce the necessary comparable result. The controlled water content is indicated in terms of excess over the normal residual content which would be produced at atmospheric pressure in the absence of returning water.

The practice and advantages of the present invention may be seen in the following examples which are intended as illustrative. Except as otherwise noted, all fluid measure is by volume and all other parts and percentages are on a weight basis.

*Example 1*

To illustrate the results obtained without controlling the water content during gas evolution, a copper reduction end liquor was obtained having a specific gravity of 1.192 and the following analysis:

| Content: | Gms./liter |
|---|---|
| Cu | 57.31 |
| Zn | 49.28 |
| $NH_3$ | 151.5 |
| $CO_2$ | 170.24 |
| $H_2O$ | 754 |

In an open vessel, 500 parts by volume is evaporated at the boil with stirring until the precipitate has a visibly blue color. The boiling point rose from 78° C. to about 84° C. Some liquor is lost by spattering. Heating is stopped, the slurry cooled to about 32° C. and the precipitate is collected by filtration, washed twice with water and dried. The dried solids contain about 30% of the zinc and analyze about 5.2% copper.

Example 2

For comparison, Example 1 is repeated on another 500 parts by volume of the same sample. During heating, five portions of 20 parts of water are added. Evaporation is continued to a final volume of about 340 parts by volume, the slurry being cooled, filtered, washed and dried as in Example 1. A filtrate of 1.194 specific gravity and the following analysis:

| | Gms./liter |
|---|---|
| Cu | 78.35 |
| Zn | 35.32 |
| $NH_3$ | 82.75 |
| $CO_2$ | 97.92 |
| $H_2O$ | 612 | is obtained indicating a total evaporation of 171 parts $H_2O$. A white precipitate containing about 50% of the zinc is obtained with the following analysis:

| Content: | Gms./liter |
|---|---|
| Zn | 50.91 |
| Cu | 0.20 |
| $NH_3$ | 4.32 |
| $CO_2$ | 19.00 |

This analysis indicates a probable formula of:

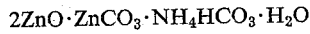

$$2ZnO \cdot ZnCO_3 \cdot NH_4HCO_3 \cdot H_2O$$

which has the theoretical analysis of:

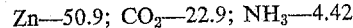

Zn—50.9; $CO_2$—22.9; $NH_3$—4.42

Example 3

A sample of copper-reduction end liquor from commercial operation is found to have a specific gravity of 1.2 and the following analysis:

| Content: | Gms./liter |
|---|---|
| Cu | 53 |
| Zn | 46 |
| $NH_3$ | 202 |
| $CO_2$ | 160 |
| $H_2O$ | 732 |

Fifteen hundred parts by volume of this liquor is placed in a distillation kettle equipped for reflux and evaporated to about 1015 volumes during which time about 332 volumes of condensate is refluxed. The temperature increase is from about 75° C. to about 88° C. Slurry is cooled to about 32° C., filtered, and the filter cake is washed and dried. About 995 volumes of filtrate of 1.18 specific gravity is obtained, containing (gms./liter):

| | |
|---|---|
| Cu | 79.9 |
| Zn | 36.5 |
| $NH_3$ | 82.6 |
| $CO_2$ | 72 |
| $H_2O$ | 907 |

The filter cake contained about 48% of the initial zinc in a white solid having the analysis:

| | Percent |
|---|---|
| Zn | 47.33 |
| Cu | 0.076 |
| $NH_3$ | 7.49 |
| $CO_2$ | 25.44 |

The foregoing discussion has been based on the premise of passing all the copper-reduction and liquor through the zinc precipitation circuit with a view to retaining some 70–75 gms./liter of dissolved copper and reducing the total dissolved zinc content by about 50%. Where the total zinc dissolved in any one leaching cycle does not increase the total dissolved zinc in the circuit to above the 50–70 gms./liter level, various split flow proportions can be utilized to remove the necessary zinc. Similarly, where in each cycle it is necessary to remove a larger amount substantially copper-free zinc in any one overall cycle, this can be accomplished by taking out more copper in the copper reduction circuit prior to zinc precipitation. If necessary, copper can be reduced to the 20 g./l. value noted above. Again, all or only part of the liquor in the whole circuit may be so treated.

As noted above, it is generally desirable, though not essential, to cool the liquor after the heating treatment but before filtering out the zinc precipitate. Since cooling means are conventional as well as are the solids-liquor separating means, in the appended claims it is contemplated that cooling as well as filtering or centrifuging generally will be considered as part of the precipitate collection.

We claim:

1. In treating a zinciferous ammoniacal-ammonium carbonate liquor containing (a) at least about 20 gms. per liter of dissolved zinc, (b) dissolved copper in amount at least equal to said dissolved zinc but less than about four times the amount of dissolved zinc, and (c) ammonia in excess of that required to hold said copper and zinc in solution at ambient temperature as metal ammine complexes, by evolving ammonia and carbon dioxide therefrom, thereby selectively precipitating zinc values while retaining copper values in solution: the improvement which comprises: heating said solution to a temperature of from about 60° to about 95° C., but not above the boiling point, for sufficient time to initiate volatilization of ammonia, carbon dioxide and water vapor therefrom; continuing said heating and gas evolution for sufficient time to evolve substantially all ammonia and carbon dioxide not associated with zinc and copper in a metal complex and cause precipitation of whitish substantially copper-free zinciferous solids; further continuing said heating and gas evolution with concomitant precipitation; during said gas evolution maintaining in said solution a water content at least 40% in excess of that which would otherwise be produced by water vapor evolution; stopping said heating and precipitation prior to noticeable co-precipitation of copper-bearing solids and collecting resultant precipitate in which zinc is substantially the only metal.

2. A process according to claim 1 in which evolved water vapor is condensed and condensate is returned as said added water.

3. A process according to claim 1 in which evolved water vapor is passed through a reflux condenser and liquid reflux is returned at a rate at least 25% of that at which water vapor is being evolved.

4. A process according to claim 1 in which substantially half of the dissolved zinc is precipitated during said heating.

5. A process according to claim 1 in which, after heating is stopped, resultant slurry is cooled to about 32° C. or less prior to said collecting of zinc-bearing precipitate.

6. A process according to claim 5 in which said process liquor contains from about 20-70 g./l. of dissolved copper and said heating is stopped when resultant copper concentration after cooling is about 70-75 g./l.

7. A process according to claim 5 in which said process liquor contains from about 20 to about 65 g./l. of zinc and from about 20 to about 70 g./l. of copper and said heating is stopped when resultant copper concentration after cooling is about 70-75 g./l.

8. A process according to claim 1 in which evolved water vapor is partially condensed by direct contact with incoming cold feed liquor in a reflux column whereby at least 25% of evolved water is returned.

References Cited in the file of this patent

UNITED STATES PATENTS

| | | |
|---|---|---|
| 1,579,302 | Gidden et al. | Apr. 6, 1926 |
| 2,695,843 | Schaufelberger et al. | Nov. 30, 1954 |

FOREIGN PATENTS

| | | |
|---|---|---|
| 155,412 | Australia | Feb. 25, 1954 |